United States Patent
Rottler et al.

(10) Patent No.: US 7,726,919 B1
(45) Date of Patent: Jun. 1, 2010

(54) RESURFACING MACHINE TOOL

(75) Inventors: Donald Brooks Rottler, Seattle, WA (US); Anthony R C Usher, Auburn, WA (US); Ranjit (Robin) Chera, Chandigarh (IN); Andrew Rottler, Seattle, WA (US)

(73) Assignee: Rottler Manufacturing Inc., Kent, WA (US)

( * ) Notice: Subject to any disclaimer, the term of this patent is extended or adjusted under 35 U.S.C. 154(b) by 38 days.

(21) Appl. No.: 11/344,943

(22) Filed: Feb. 1, 2006

Related U.S. Application Data

(60) Provisional application No. 60/649,458, filed on Feb. 1, 2005.

(51) Int. Cl.
B23C 5/00 (2006.01)
B23C 5/26 (2006.01)
B23B 41/12 (2006.01)

(52) U.S. Cl. ............... 409/234; 409/232; 409/201; 408/83.5; 408/127; 279/16; 81/177.8; 81/177.75

(58) Field of Classification Search ............... 409/201, 409/211, 216, 232, 234; 408/127, 83.5, 236, 408/709, 80; 279/16; 81/177.8, 177.6, 57.26, 81/177.75
See application file for complete search history.

(56) References Cited

U.S. PATENT DOCUMENTS

| | | | | |
|---|---|---|---|---|
| 2,453,825 A | * | 11/1948 | Wright ..................... | 82/148 |
| 2,483,096 A | * | 9/1949 | Jaworowski et al. ........... | 279/5 |
| 3,829,109 A | * | 8/1974 | Koch ........................... | 279/91 |
| 3,855,884 A | * | 12/1974 | McPeak .................. | 81/177.75 |
| 4,347,450 A | * | 8/1982 | Colligan ..................... | 310/50 |
| 4,461,192 A | * | 7/1984 | Suligoy et al. ............ | 81/177.6 |
| 4,630,977 A | * | 12/1986 | Theofanous ............... | 408/83.5 |
| 4,804,048 A | * | 2/1989 | Porth, Jr. ................... | 81/57.22 |
| 5,752,706 A | * | 5/1998 | Hodges ...................... | 279/16 |
| 6,490,955 B2 | * | 12/2002 | Chang-Kao et al. ...... | 81/177.75 |
| 2003/0079581 A1 | * | 5/2003 | Beauchamp ................. | 81/490 |

OTHER PUBLICATIONS

Merriam-Webster's Collegiate Dictionary, 10th ed., copyright 1998, two pages including the definitions of "over".*

* cited by examiner

*Primary Examiner*—Erica E Cadugan
(74) *Attorney, Agent, or Firm*—Christensen O'Connor Johnson Kindness PLLC

(57) ABSTRACT

A machine tool includes a driver, a tool holder, and a locking device in the form of, for example, an alignment collar. In use, the machine tool carries a tool, such as a surface refinishing bit, which may be lowered into a workpiece bore, such as a cylinder head valve seat, and subsequently rotated by a machine spindle for resurfacing the bore. The machine tool receives a pilot shaft placed in a reference bore associated with the workpiece bore. The pilot shaft functions to ensure general alignment of the machine tool cutting axis and the refinishing surface.

4 Claims, 8 Drawing Sheets

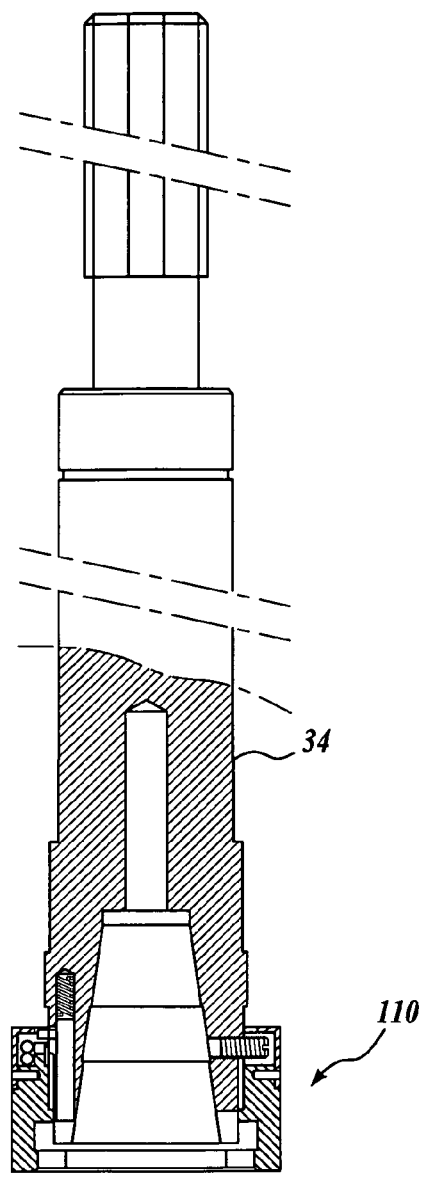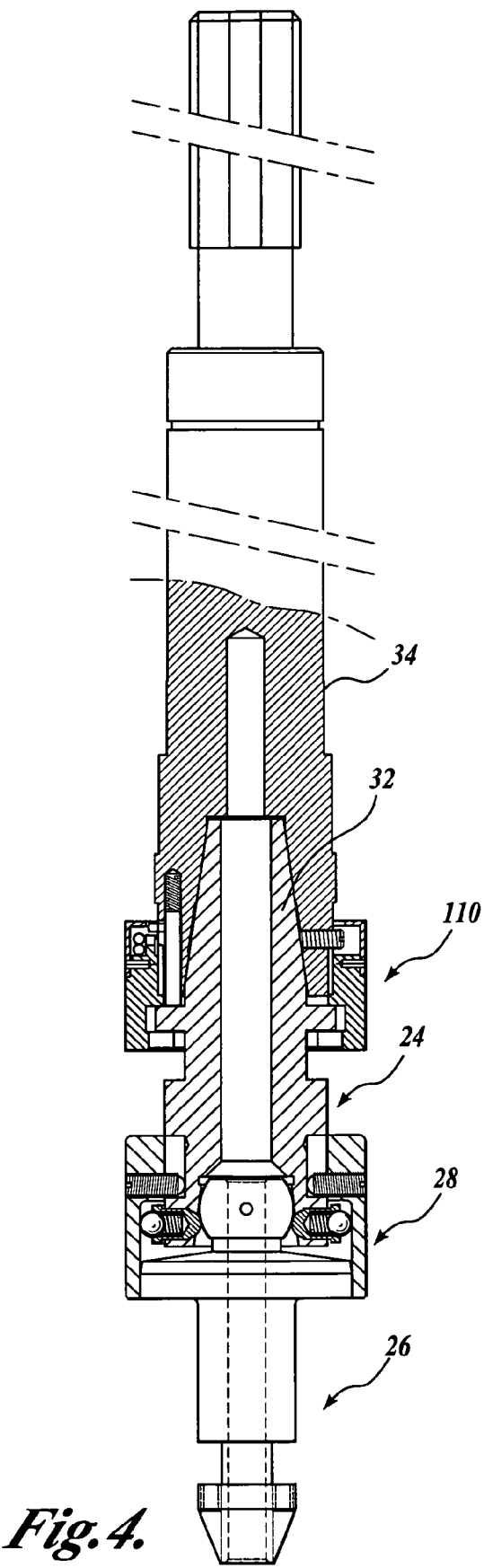
*Fig.3.*
*Fig.4.*

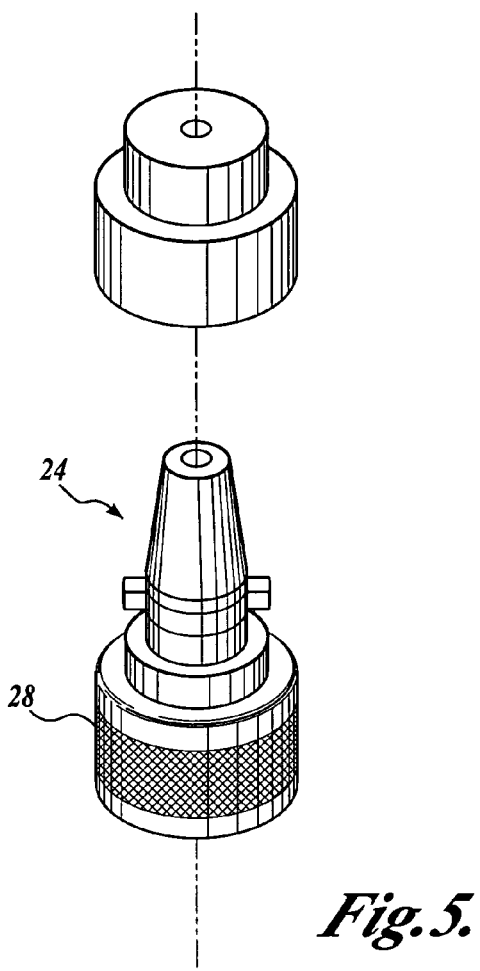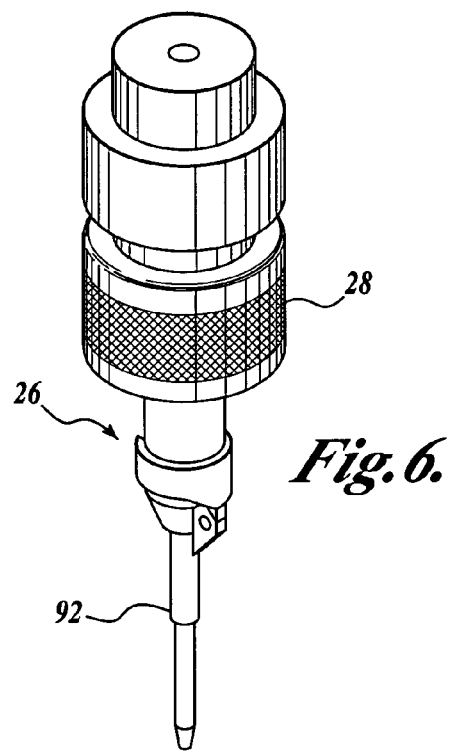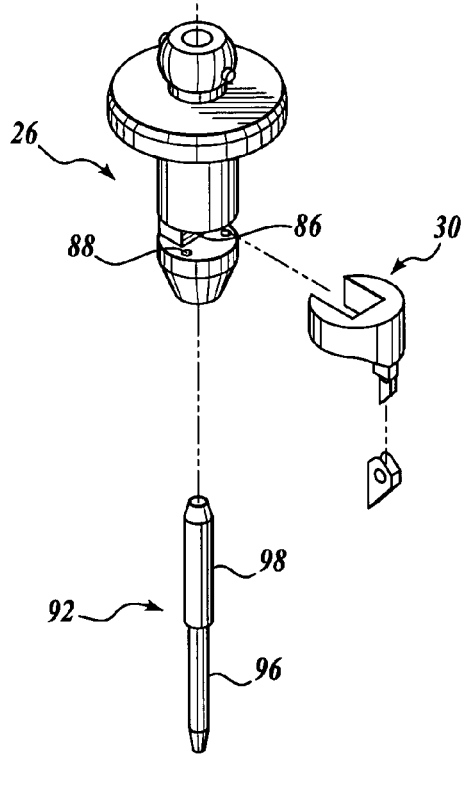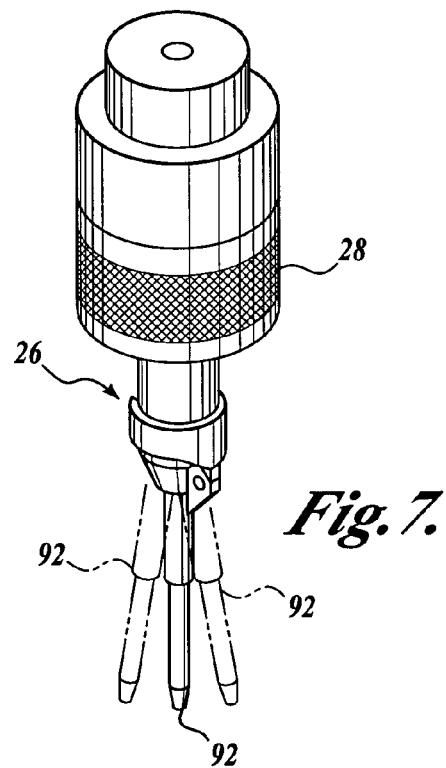
Fig. 5.
Fig. 6.
Fig. 7.

RESURFACING MACHINE TOOL

CROSS-REFERENCE TO RELATED APPLICATION

This application claims the benefit of U.S. Provisional Application No. 60/649,458, filed Feb. 1, 2005, the disclosure of which is hereby incorporated by reference.

BACKGROUND

It is well known in the machining art that multiple machining operations require repositioning of the workpiece or repositioning of the machine spindle to precisely align the center line of a work piece reference bore with the centerline of the machine spindle, thereby ensuring a concentric and longitudinal orientation of the machining tool. When the alignment angle between the reference bore and the spindle is not accurate, a misalignment angle between the tool and workpiece results. This misalignment angle may result in the tool providing inaccurate or uneven machining. To prevent this, either the work piece or the machining spindle must be realigned, relative to one another, so as to negate the misalignment angle. To reposition the machine spindle generally requires manual realignment of the machine spindle relative to the workpiece or repositioning the workpiece relative to the machine spindle. Such repositioning is generally impractical as well as time consuming, and therefore expensive.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present invention, an apparatus is provided, that comprises a driver defining a first matable structure and a tool holder defining a second matable structure that is configured to cooperatively connect with the first matable structure in such a manner as to allow the tool holder to pivot with respect to the driver in one or more directions and to be rotationally driven by the driver. The apparatus further comprises a locking device that is movable between a first position, wherein the tool holder is permitted to pivot with respect to the driver, and a second position, wherein the tool holder is locked in position with respect to the driver so that the tool holder is prohibited from pivoting with respect to the driver.

In accordance with another aspect of the present invention, a machine tool is provided. The machine tool comprises a driver adapted to be connected to a rotational spindle and a tool holder movably coupled to the driver in such a manner as to allow the tool holder to pivot with respect to the driver in at least one direction and to be rotationally driven by the driver. The tool holder includes an engagement surface. The machine tool further comprises a collar carried by the driver or the tool holder. The collar is movable between an fixed position, wherein the longitudinal axes of the driver and the tool holder are substantially coaxial and the collar contacts the engagement surface of the tool holder such that the tool holder is prohibited from pivoting with respect to the driver, and a universal position, wherein the collar is free from contacting the engagement surface of the tool holder so that the tool holder is permitted to pivot with respect to the driver.

In accordance with yet another aspect of the present invention, a method is provided for resurfacing a workpiece. The method comprises providing a machine tool that comprises a driver, a tool holder defining a longitudinal bore and carrying a resurfacing tool, and a locking device. The tool holder is movably coupled to the driver in such a manner as to allow the tool holder to pivot with respect to the driver in one or more directions and to be rotationally driven by the driver. The locking device is movable between an unlocked position, wherein the tool holder is permitted to pivot with respect to the driver, and a locked position, wherein the tool holder is locked in position with respect to the driver so that the tool holder is prohibited from pivoting with respect to the driver. The method also comprises lowering the machine tool over a pilot shaft position in a bore of the workpiece to be resurfaced such that the pilot shaft enters the longitudinal bore of the tool holder. The machine tool is lowered with the collar in the locked position. The method further comprises moving the collar to the unlocked position so that the tool holder is capable of movement with respect to the driver in order to substantially align with the pilot shaft.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 3 is a partial cross section view of a spindle lock nut system constructed in accordance with aspects of the present invention;

FIG. 4 is a partial cross-sectional view of the machine tool of FIG. 2 releasably coupled to a machine spindle via the spindle lock nut system of FIG. 3;

FIG. 5 is a perspective, assembly view of the machine tool constructed in accordance with aspects of the present invention;

FIG. 6 is a perspective view of the machine tool in the fixed position;

FIG. 7 is a perspective view of the machine tool in the universal position;

DETAILED DESCRIPTION

Figure 1:
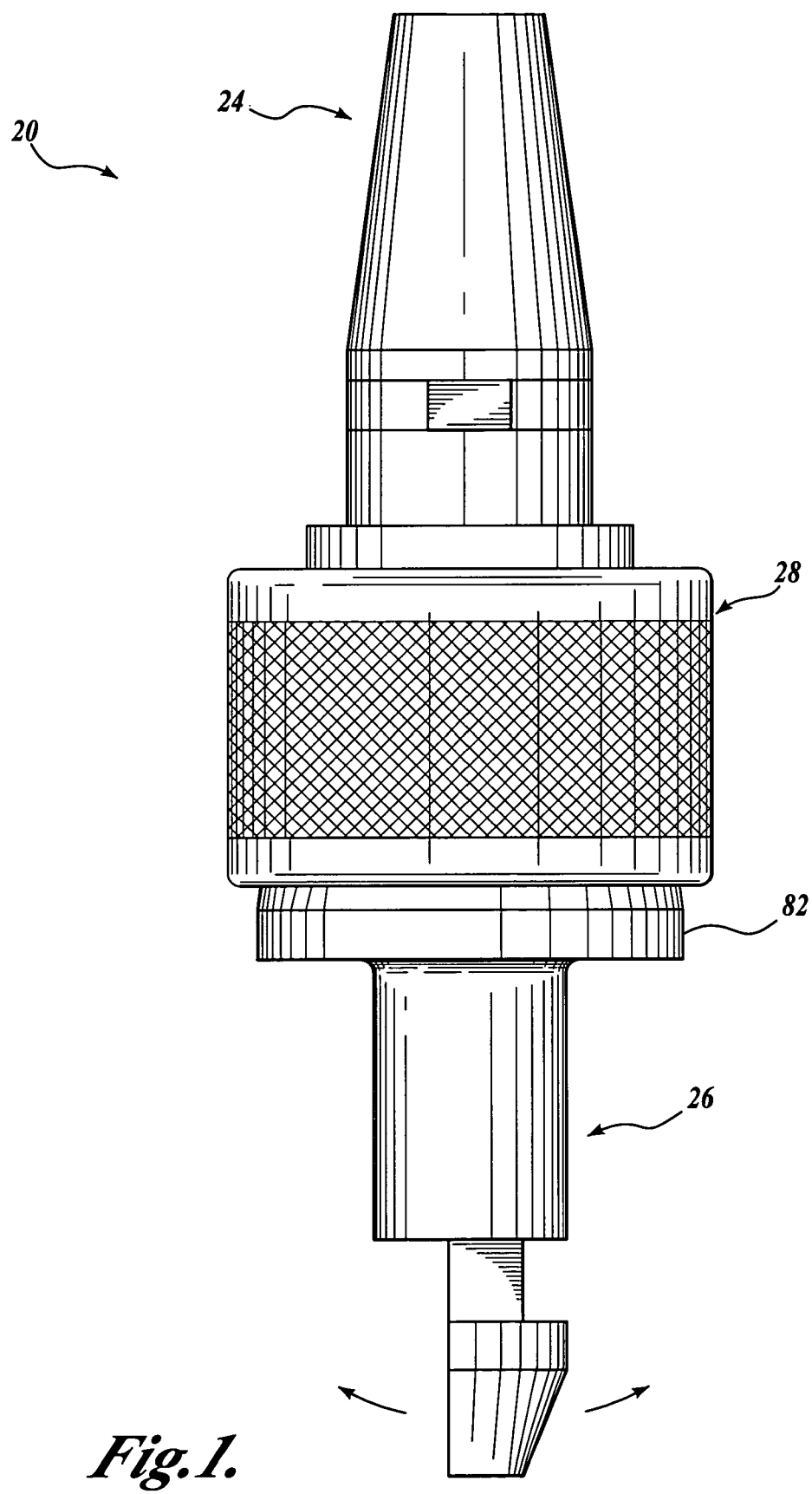
FIG. 1 is a side elevational view of an exemplary embodiment of a machine tool constructed in accordance with the present invention.

Embodiments of the present invention will now be described with reference to the drawings where like numerals correspond to like elements. FIG. 1 illustrates a side elevational view of one exemplary embodiment of a machine tool 20 constructed in accordance with aspects of the present invention. The machine tool 20 includes a driver 24, a tool holder 26, and an alignment collar 28. In use, the machine tool 20 carries a surface refinishing bit 30 (see FIG. 5), which may be lowered into a workpiece bore, such as a cylinder head valve seat, and subsequently rotated by a machine spindle (not shown) for resurfacing the bore. As will be described in detail below, the machine tool 20 receives a pilot shaft 92 (See FIGS. 5-7) placed in a reference bore associated with the workpiece bore. The pilot shaft 92 functions to ensure general alignment of the machine tool cutting axis and the refinishing surface.

Figure 2:
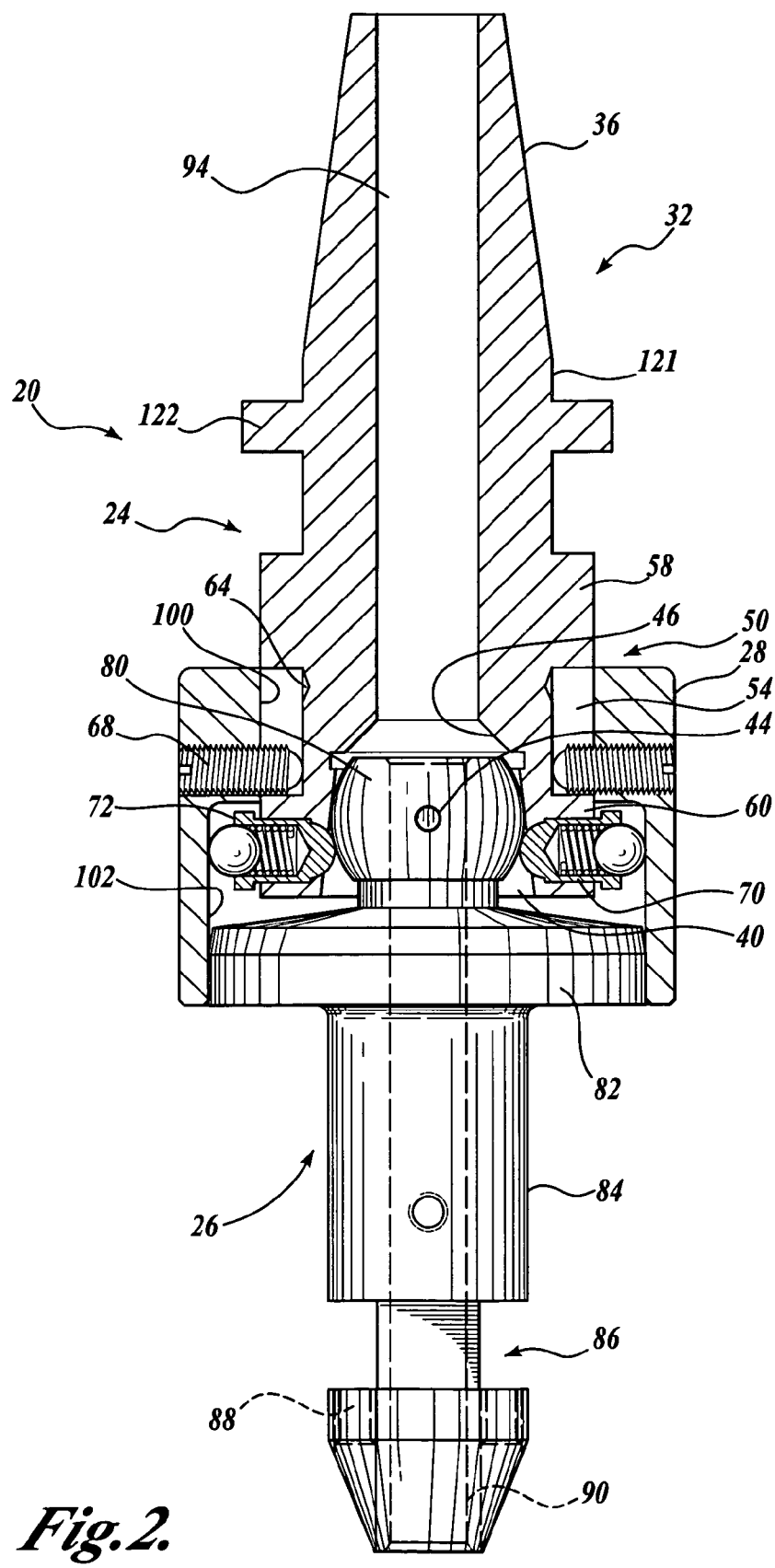
FIG. 2 is a cross section view of the machine tool of FIG. 1.

As best shown in FIGS. 2 and 4, the driver 24 includes a spindle shaft 32 which, when used with a typical machining apparatus (not shown), is fixedly connected to a machine spindle 34 of the machining apparatus. In one embodiment, the exemplary machining apparatus includes the machine spindle carried by an upper support that is movable along a vertical axis. The machining apparatus further includes a lower support deck that supports the workpiece, such as a cylinder head, during resurfacing. The lower support deck is movable in a substantially horizontal plane for generally aligning the workpiece with the machine spindle. In one embodiment, an adjustable trunnion assembly may be used to hold the workpiece during resurfacing. The adjustable trunnion assembly is placed on the lower support deck. The adjustable trunnion assembly may include clamps to hold down the workpiece and an axis aligning control mechanism that permits fine position adjustment of the workpiece. The aligning control mechanism may rotate the workpiece about vertical and horizontal axes. Other movement for permitting fine adjustment may be accomplished by the trunnion assembly, if desired.

In the embodiment shown in FIGS. 1-4, the spindle shaft 32 is formed with a quick change male taper 36 that may be removably coupled in a rotationally driven manner through a cooperatively configured, one handed automatic tightening spindle lock nut system 110 (hereinafter "lock nut system"), as will be described in detail below. At the end of the driver 24 opposite the spindle shaft 32, there is formed a matable structure, such as a socket or insert receiving region 40, as shown best in FIG. 2. The insert receiving region 40 includes notches or slots (not shown in FIG. 2), which removably receive and engage laterally disposed pins 44 formed on the tool holder 26, as will be described in detail below. Such slots for receiving the pins are well know in the art, and are described in detail in U.S. Pat. No. 6,352,394, which is hereby incorporated by reference. The insert receiving region 40 may be configured with an upwardly forming taper 46 for acting as a single centering and driving seat.

The lower section 50 of the driver 24, which forms the insert receiving region 40, is a cylindrical structure and includes an annular slot 54, thereby forming upper and lower regions 58 and 60 having substantially identical outer diameters. The upper and lower regions 58 and 60 provide seating surfaces on which the alignment collar 28 translates, as will be described in detail below. Formed in the upper end of the annular slot 54 are opposing V-grooves 64 sized and configured for receiving ball detents 68 carried by the alignment collar 28, as will be described in detail below. Alternatively, the annular slot may be formed as opposing elongated slots that receive ball detents 68 carried by the alignment collar 28. The lower section 50 of the driver 24 further includes a plurality of laterally oriented apertures 70 that open into the insert receiving region 40. The apertures 70 may be spaced equally apart, and are configured for receiving plungers 72 therein. The plungers 72 function to retain a portion of the tool holder 26 when fitted therein, as will be described in detail below. In one embodiment, the plungers 72 include a plunger body defining a cavity which holds a biasing member, such as spring, and a ball bearing.

As best shown in FIG. 2, the tool holder 26 is formed with a matable structure, such as a substantially spherical upper insert portion 80 with outwardly extending pins 44, a peripherally extending flange 82 disposes at its midsection, and a lower portion 84. When coupled to the driver: 1) the insert portion 80 is inserted into the insert receiving region 40 of the driver 24, and retained therein by the inwardly biased plungers 72; and 2) the pins 44 are received in correspondingly formed slots in the driver 24 for creating a pin drive connection. In the embodiment shown and described herein, the connection of insert portion 80 and insert receiving region 40 results in a flex joint having a ball-joint type configuration. It should be understood that the present invention may utilize any other flexible connection to achieve the desired rotational freedom for the tool holder as described herein. The insert receiving region 40 may include a conical shape to ensure a continuous fit of the insert portion 80. Preferably, the insert receiving region 40 is shaped to provide a surface which ensures at least three points of contact between the insert portion 80 and the insert receiving region 40. When properly fitted together the insert portion 80 and insert receiving region 40 form a flex joint that allows the tool holder to move with two degrees of freedom with respect to the driver.

The actual resurfacing of a workpiece 106 (See FIG. 11) is accomplished by the rotation of a tool, such as surface refinishing bit 30, carried by the tool holder 26, as best shown in FIG. 5. To that end, the surface refinishing bit 30 may be integrally formed on the lower portion 84 of the tool holder 26, or connected to the lower portion 84 of the tool holder 26 with clamps, screws, or other attachment means. In the embodiment shown, the lower portion 84 of the tool holder includes a squared radial groove 86 that receives a cooperatively configured portion of the surface refinishing bit 30. Two threaded holes 88 are provided for receiving threaded fasteners that clamp the surface refinishing bit 30 to the tool holder lower portion 84. It should be obvious to one of ordinary skill in the art that the tool holder 26 may carry other tools or multiple configurations of tools in addition to or in place of surface refinishing bit 30. Furthermore, it should also be obvious that any type of surface refinishing bit 30, besides that which is shown in the various figures may be utilized with the tool holder 26.

Figure 11:
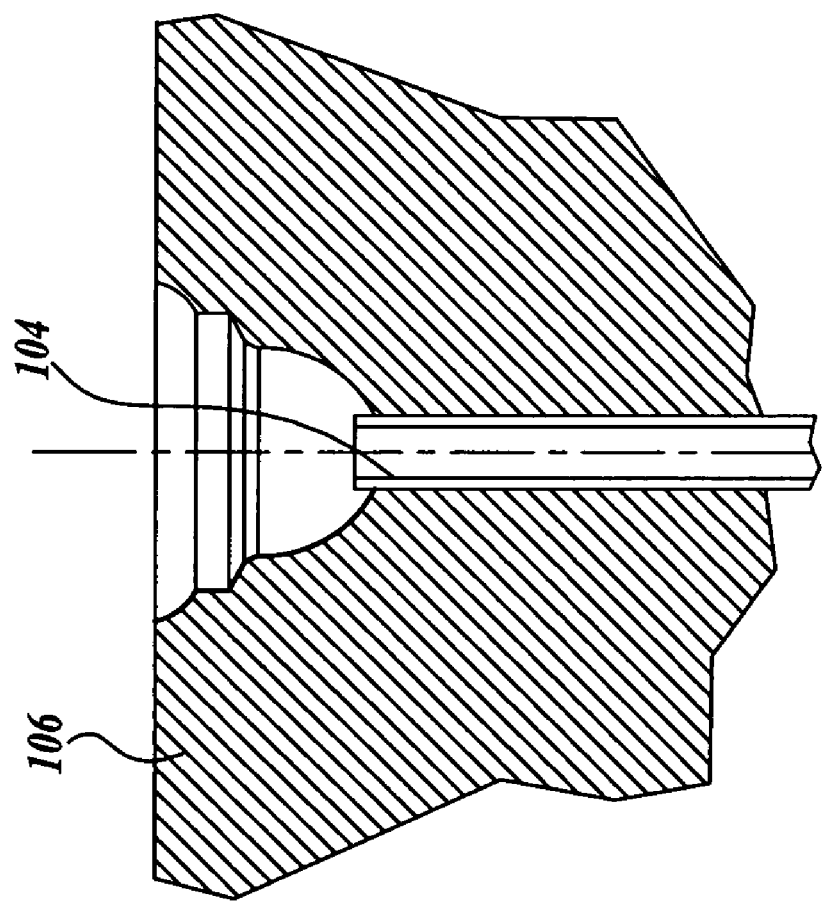
FIG. 11 is a cross section view of a workpiece to be resurfaced by the machine tool of FIG. 1.

The tool holder 26 further includes a centralized, longitudinally extending bore 90 for receiving a pilot shaft 92, as best shown in FIG. 2. Turning now to FIG. 5, the pilot shaft 92 is preferably formed with a lower section 96 having a first diameter and a upper section 98 having a larger, second diameter. The upper section 98 is sized and configured for slidably contacting the bore 90 in a loosely fitting manner so as to provide slight movement between the pilot shaft and the tool holder. In several embodiments, the difference in diameter between the bore 90 and the upper section 98 of the pilot shaft is in the range of approximately 0.1-10 mm. The lower section 96 is sized and configured for slidably contacting the reference bore 104 of the workpiece 106 to be resurfaced in a seating manner, as best shown in FIG. 11. The ends of the pilot shaft 92 may be tapered, if desired.

Figure 12:
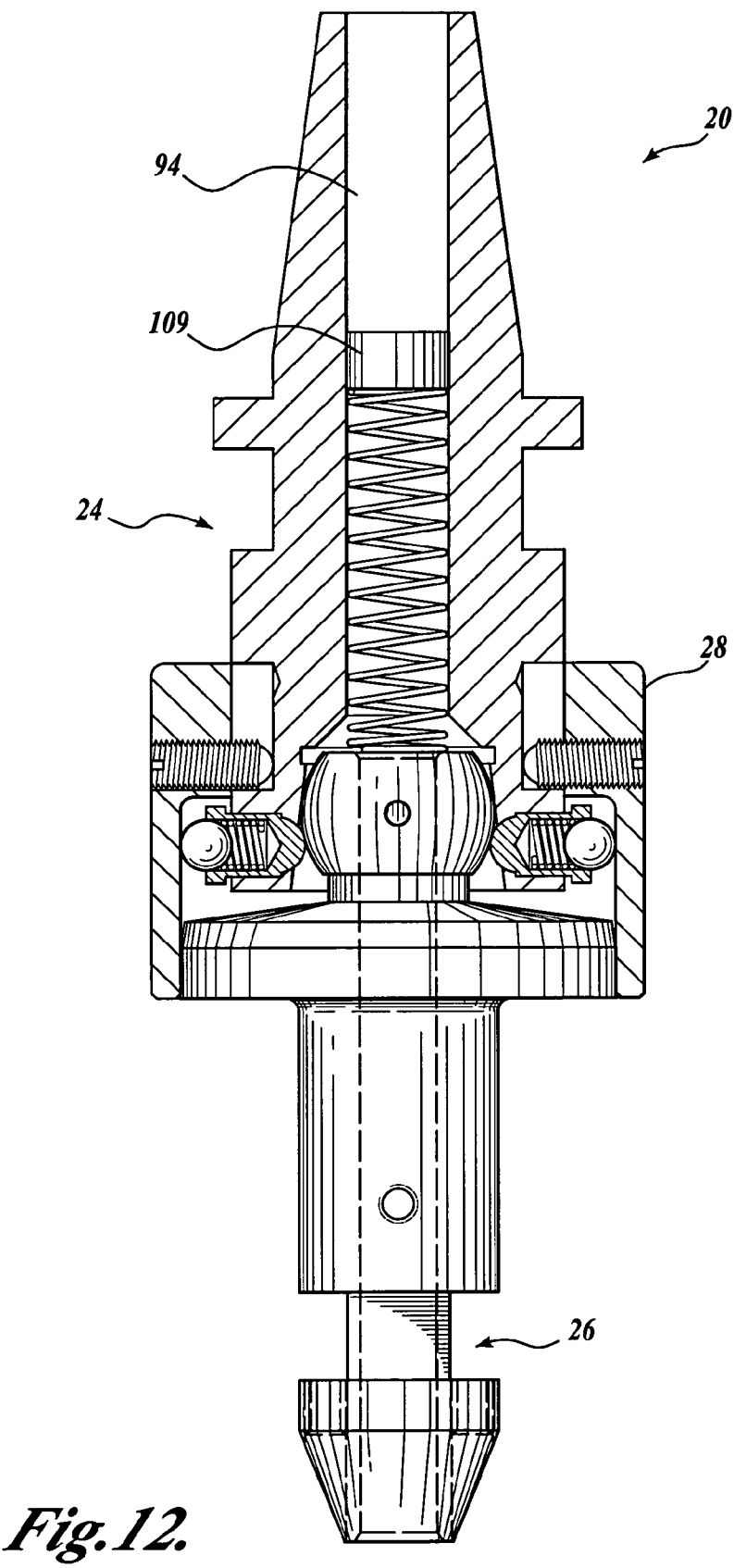
FIG. 12 is a cross sectional view of an alternative embodiment of the machine tool constructed in accordance with aspects of the present invention.

In one embodiment shown in FIG. 2, the bore 90 is coaxially aligned with a bore 94 defined by the driver 24. In another embodiment shown best in FIG. 12, the bore 94 may form a housing that contains a biasing member 108, such as a coil spring, for biasing the pilot shaft downwardly against the reference bore of the workpiece. To fix the biasing member within the bore 94 and to exert a force thereagainst, a retainer 109 may be securely position within the bore 94 in the position shown in FIG. 12.

Returning to FIG. 2, a locking device, such as the alignment collar 28 is carried on, for example, the lower portion 58 of the driver 24. The alignment collar 28 is configured with a stepped bore formed by upper and lower sections 100 and 102. The upper section 100 has an inner diameter that is smaller than the inner diameter of the lower section 102. The upper section 100 is sized and configured for sliding engagement against the portion 58 of the driver 24. The lower section 102 is sized and configured to slidably engage the flange 82 of the tool holder 26. The lower section 102 also functions to retain the plungers 72 in the apertures 70, which in turn, retains the insert portion 80 of the tool holder 26 with the driver 24.

A plurality of detents 68 are carried by the upper portion of the alignment collar 28 and extend into the upper section 100. The detents 68 are adapted to seat in the V-grooves 64 of the driver 24. The alignment collar 28 translates over the lower portion 58 of the driver 24 in a supported manner between a fixed or locked position shown in FIG. 2 and a universal position shown in FIG. 1. In the fixed or locked position, the alignment collar 28 is in its lowered positioned and the tool holder 26 is prohibited from pivoting at the insert portion 80 due to the engagement between the alignment collar 28 and the flange 82. When the alignment collar 28 is translated upward and into its universal position, the detents 68 of the alignment collar 28 engage the V-grooves 64, thereby selectively holding the alignment collar 28 in the position shown, and as a result, the tool holder 26 is free to pivot about the insert portion 80 a pre-selected amount.

In use, the elongate pilot shaft 92 is inserted into a reference bore 104 of a workpiece 106 shown in FIG. 11. The reference bore 104 may be an inherent part of the construction of the workpiece 106 or may be specifically bored in preparation to receive a machine tool such as presently disclosed. The machine tool 20, if not already assembled, may be assembled by inserting the tool holder 26 in the driver 24. Once assembled, the alignment collar 28 is translated into the locked position shown in FIG. 2 so that the tool holder 26 is locked in position for allowing it to be easily lowered over the pilot shaft 92 positioned in the reference bore 104.

The machine tool 20 and a reference bore 104 of the workpiece may then be brought into substantially alignment, for example, by movement of the lower support deck of the machining apparatus. In embodiments that utilize an adjustable trunnion assembly for holding the workpiece during resurfacing, fine position adjustments (e.g., vertical, horizontal, etc.) of the workpiece can be made by an axis aligning control mechanism. When the workpiece to be resurfaced is properly aligned with the tool holder 26 of the machine tool 20, the machine tool 20 is lowered with respect to the workpiece such that the pilot shaft is inserted into the bore 90 of the tool holder. The machine tool is lowered until the tool carried by the tool holder 26, such as the insert bit 30, contacts the surface of the workpiece to be resurfaced.

Once lowered over the pilot shaft 92, the alignment collar 28 is translated upwardly into the universal position so that the tool holder 26 may pivot with respect to the driver 24. This allows the tool holder 26 fine movement with respect to the driver 24 for precisely centering the tool holder 26 around the pilot shaft 92 to ensure general alignment of the machine tool cutting axis and the refinishing surface. Next, the driver 24 is rotatably driven by the machine spindle 34, which in turn, rotates the tool holder 26 and insert bit 30 for resurfacing the workpiece 106. Once resurfacing is complete, the machine tool 20 is lifted up from the pilot shaft 92 and at the same or subsequent time, the alignment collar 28 is lowered to the locked position. The machine tool 20 may then repeat the aforementioned steps to resurface other surfaces (not shown) of the workpiece 106 using other reference bores in conjunction with the same or other pilot shafts.

Figure 8:
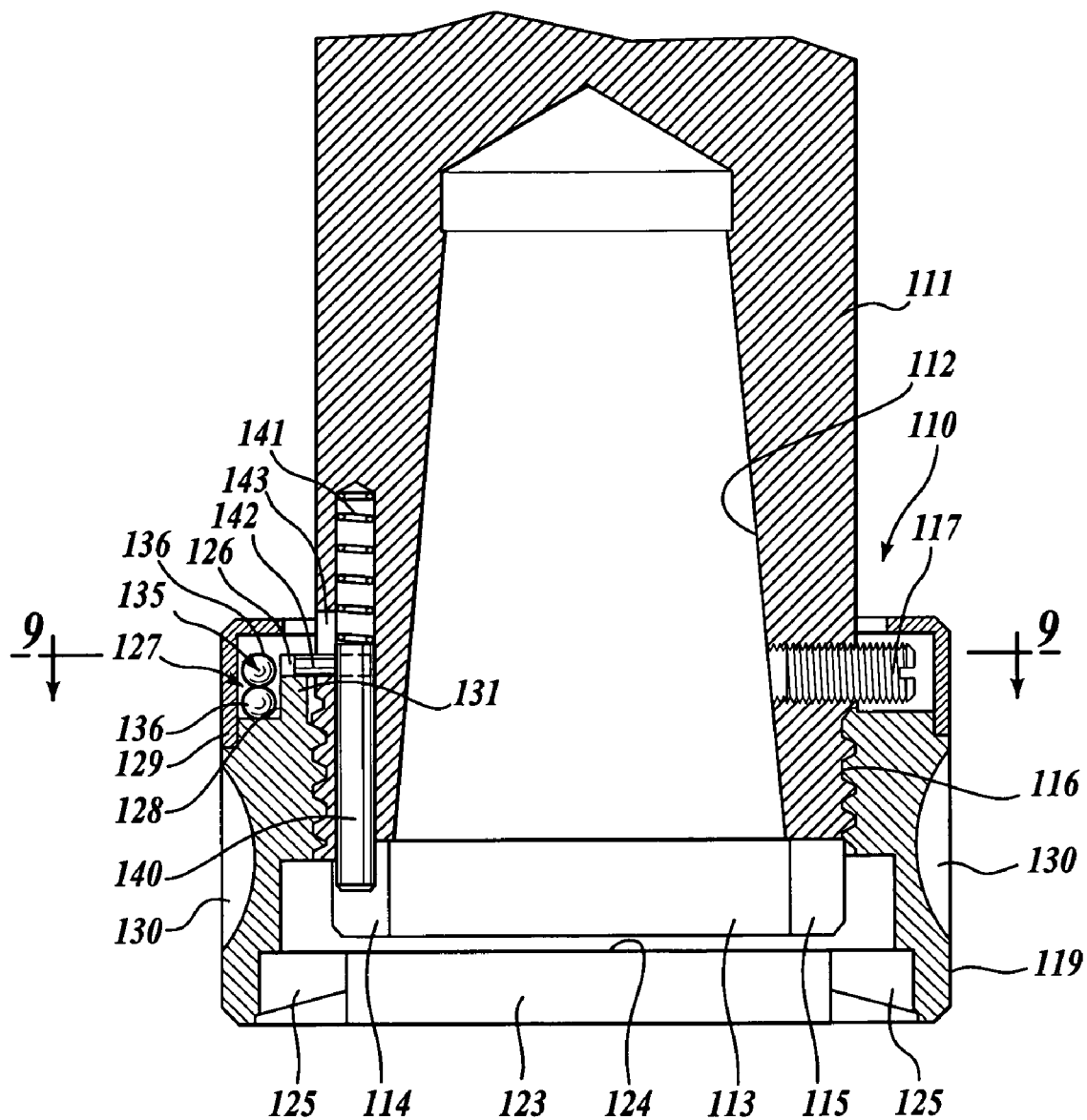
FIG. 8 is a side cross sectional view of one embodiment of a spindle lock nut system constructed in accordance with aspects of the present invention.
Figure 9:
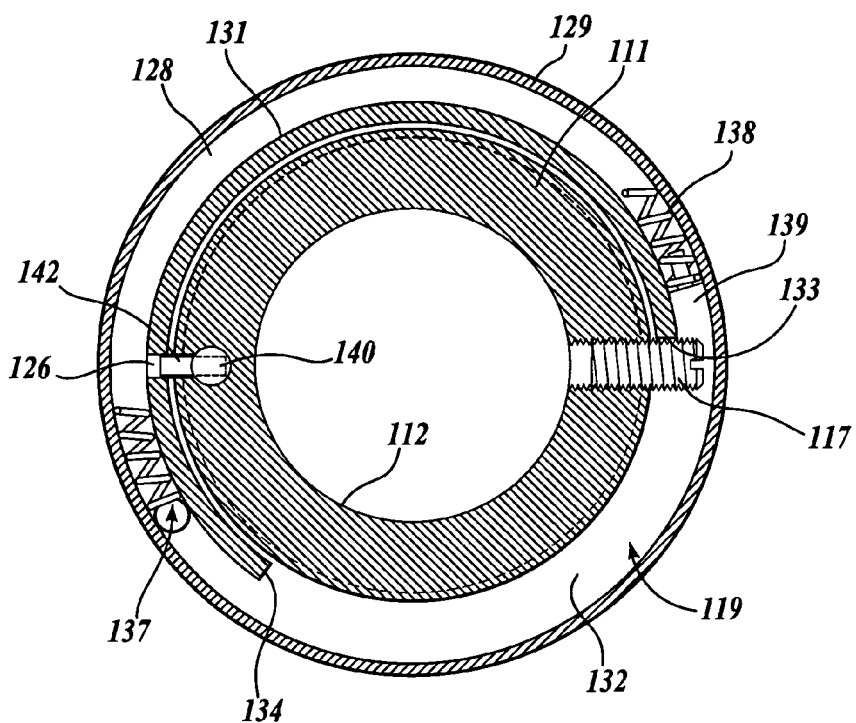
FIG. 9 is a cross sectional view taken from section line 9-9 shown in FIG. 8.
Figure 10:
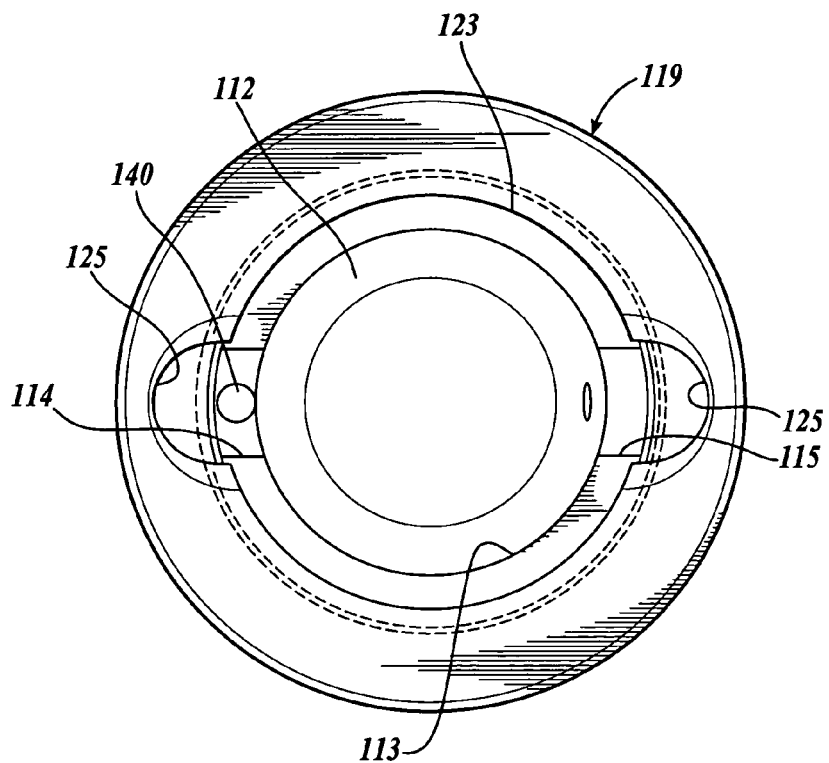
FIG. 10 is a bottom view of the spindle lock nut system of FIG. 8.

As was described above, the spindle shaft 36 of the driver 24 may be drivenly connected in a selectively removably manner to a spindle 34 of the machine apparatus through a lock nut system 110. Turning now to FIGS. 8-10, there is shown one embodiment of the system 110 constructed in accordance with the present invention. As best shown in FIG. 8, the system 110 includes a hollow supporting member 111 which has a recess that includes a tapered portion 112 and an outer cylindrical portion 113. The hollow supporting member may or may not be part of the machine spindle 34. The cylindrical portion 113 is slotted at 114 and 115. The end portion of the supporting member 111 is threaded at 116. Adjacent the threads 116, the supporting member 111 is provided with a radially projecting stop 117, which is threaded securely thereon.

As was described above in FIG. 2, the machine tool 20 includes a spindle shaft 32 that has tapered body 36, a cylindrical portion 121, and a pair of protrusions 122. The tapered body 36 is received in the recess 112, the cylindrical portion 121 is received in the recess portion 113, and the protrusions 122 are received in the slots 114, 115. The locking ring 119 has threads which mate with the thread 116 on the supporting member 111 and has a flange 123 which has an upper surface 124 that acts on the lower side of the protrusions 122, the protrusions being receptive via the flange 123 through a pair of beveled slots 125. When the slots 125 are aligned with the slots 114, 115, the machine tool 20 can be inserted or withdrawn. Such position of alignment is referred to herein as the locked position of the locking ring 119 which is the position where the tool 20 is not locked and which position is maintained by the latch mechanism described below. Thus, the unlocked position of the locking ring 119 is one wherein the tool 20 is locked into the system 110.

The locking ring 119 includes an axially opening notch 126. The locking ring 119 is further provided with a groove 127, and the structure that defines the groove 127 is all co-movable with the locking ring 119 during rotation thereof on its threads 116. The groove 127 has been provided in such a way as to avoid the necessity of any trepanning operation, and to that end there is a groove or cutout 128 on the locking ring 119 which opens radially outwardly and which also is axially open. The cutout 128 of the groove 127 that is defined by the locking ring 119 thus defines two walls of a substantially enclosed groove which encircles the rotational axis. The other two walls of the substantially closed groove 127 is provided by an annular cover 129 which has an L-shaped radial cross section and which is telescopically received on the ring 119. The locking ring 119 may further include a set of four axially elongated wrenching recesses 130 each having the shape of a Woodruff key. This structure is advantageous in that no projection is provided on the outside of the locking ring 119 and thus any threat to an unsafe condition is avoided. Alternatively, the recesses may be omitted, as best shown in the embodiment of FIG. 4.

The provision of the groove portion 128 in the locking ring 119 leaves a circumferential flange 131, and as shown in FIG. 9, the flange 131 is cut away for a little more than 112 degrees at 132 to define a pair of abutments 133, 134 that are angularly spaced from one another. The stop 117 projects horizontally between the abutments 133, 134 and so the coaction between the abutment 133 and the stop 117 limits the amount that the locking ring 119 can be loosened or unscrewed, and also serves to define accurately the position of slot alignment shown in FIG. 8 and described previously. The coaction between the abutment 134 and the stop 117 limits the amount that the locking ring 119 can be tightened. When there is a machine tool 20 in the recess 112, the tool actually limits the amount that the locking ring 119 can be tightened, but in the absence of such a tool, were it not for the cooperation between the abutment 134 and the stop 117, the locking ring 119 could be rotated in a tightening direction for 180 degrees from the position illustrated so as to create a slot alignment which would be spurious.

In the groove 127, there is provided lock spring mechanism 135. In this embodiment, the lock spring mechanism 135 comprises two equal helical coil springs 136 of the compression type disposed in parallel to each other in the groove 127. One end of the springs 136 acts against a dowel pin 137 secured to the locking ring 119, and the other ends of the springs 136 each receive a pilot 138 carried on a block 139 that also acts against one side of the stop 117.

The latch mechanism by which the locking ring 119 is held in its locked position (tool unlocked position) includes a release pin 140 which is directly slidably carried by the supporting member 111 and which moves along its own length, parallel to the rotational axis of the system 110. A spring 141 acting between the supporting member 111 and the release pin 140 directly urges the release pin toward the machine tool 20, and for that reason, the release pin 140 tends to or normally projects from the end of the supporting member 111 into the slot 114. When one of the protrusions 122 of the tool 118 engages the lower end of the release pin 140, the release pin 140 is thus forced by the machine tool 20 against the force of the spring 141 to a retracted position. A latch pin 142 has a rigid connection with the release pin 140, and the pins 140, 141 project transversely to each other. The latch pin 142 is thus moved by the release pin 140 in a direction which is perpendicular to its own length and which is parallel to the rotational axis. When the machine tool 20 is removed, the spring 141 through the release pin 40 thus urges the latch pin 142 to enter the notch 126 in the flange 131 of the locking ring 119. A slot 143 in the wall the supporting member 111 enables such vertical movement of the pins 142, the slot 143 being vertically elongated.

In operation, the spindle shaft of the machine tool 20 is inserted into the recess 112 and one of the protrusions 122 shifts the release pin 140 upwardly, thereby also raising the latch pin 142 until it clears the vertical edge of the notch 126, whereupon the lock spring mechanism 135 rotates the locking ring 119 to clamp the tool firmly in position for co-rotation. When the locking ring 119 is rotated with respect to the supporting member 111, such rotation continues until the slots 125 are aligned with the protrusions 122 whereupon the machine tool 20 becomes released and moves downwardly by gravity, and whenever the slots 114, 115 are so aligned with the slots 125, the notch 126 is aligned with the latch pin 142 so that it can drop into such notch. In the event that the locking ring 119 is rotated rapidly to achieve such alignment, the latch pin 142 is protected against damage by virtue of the simultaneous engagement of the abutment 133 with the stop 117. In the event that the release pin 140 is actuated by some other instrumentality, the lock ring 119 is restricted by the abutment 134 and the stop 117 to provide less than one-half turn of movement, such engagement also serving to preserve the preload on the lock spring means 135.

For a more detailed description of one type of lock nut system that may be practiced with the present invention, please see U.S. Pat. No. 3,829,109, which is hereby expressly incorporated by reference.

While exemplary embodiments of the invention have been illustrated and described, it will be appreciated that various changes can be made therein without departing from the spirit and scope of the invention.

The embodiments of the invention in which an exclusive property or privilege is claimed are defined as follows:

1. A machine tool, comprising:
    a driver having a longitudinal axis, a proximal section adapted to be connected to a rotational spindle, and a distal section defining an insert receiving region disposed at the end thereof;
    a tool holder having a longitudinal axis, the tool holder being movably coupled to the distal section of the driver in such a manner as to allow the tool holder to pivot with respect to the driver in two or more planes and to be rotationally driven by the driver, wherein the tool holder includes a proximal section defining a spherical insert cooperatively configured to be received by the insert receiving region of the driver, a flange spaced distally of the spherical insert and discrete therefrom, the flange extending laterally outwardly of the longitudinal axis of the tool holder and defining a peripherally extending engagement surface positioned outwardly of the spherical insert, a distal section defining a tool interface for attachment to a tool, and a longitudinally extending bore opening at the distal end of the distal section of the tool holder for receiving a pilot shaft; and
    a collar carried by the driver, the collar defining a first open ended cavity for receiving a portion of the distal section of the driver in a slideably engaging manner and a second open ended cavity for receiving the flange of the tool holder, wherein the collar is movable over the distal section of the driver between a fixed position, wherein the longitudinal axes of the driver and the tool holder are substantially coaxial and the collar contacts the engagement surface of the flange of the tool holder such that the tool holder is prohibited from pivoting with respect to the driver, and a universal position, wherein the collar is free from contacting the engagement surface of the flange of the tool holder so that the tool holder is permitted to pivot with respect to the driver.

2. The machine tool of claim 1, wherein the machine tool further comprises a tool removably connected to the tool interface of the tool holder.

3. The machine tool of claim 2, wherein the tool is a resurfacing tool bit.

4. The machine tool of claim 1, wherein the proximal section of the driver defines a spindle connection member adapted to be connected to a spindle lock nut system.

* * * * *